INVENTOR.
Luther L. Doty Jr.
BY
Attorneys

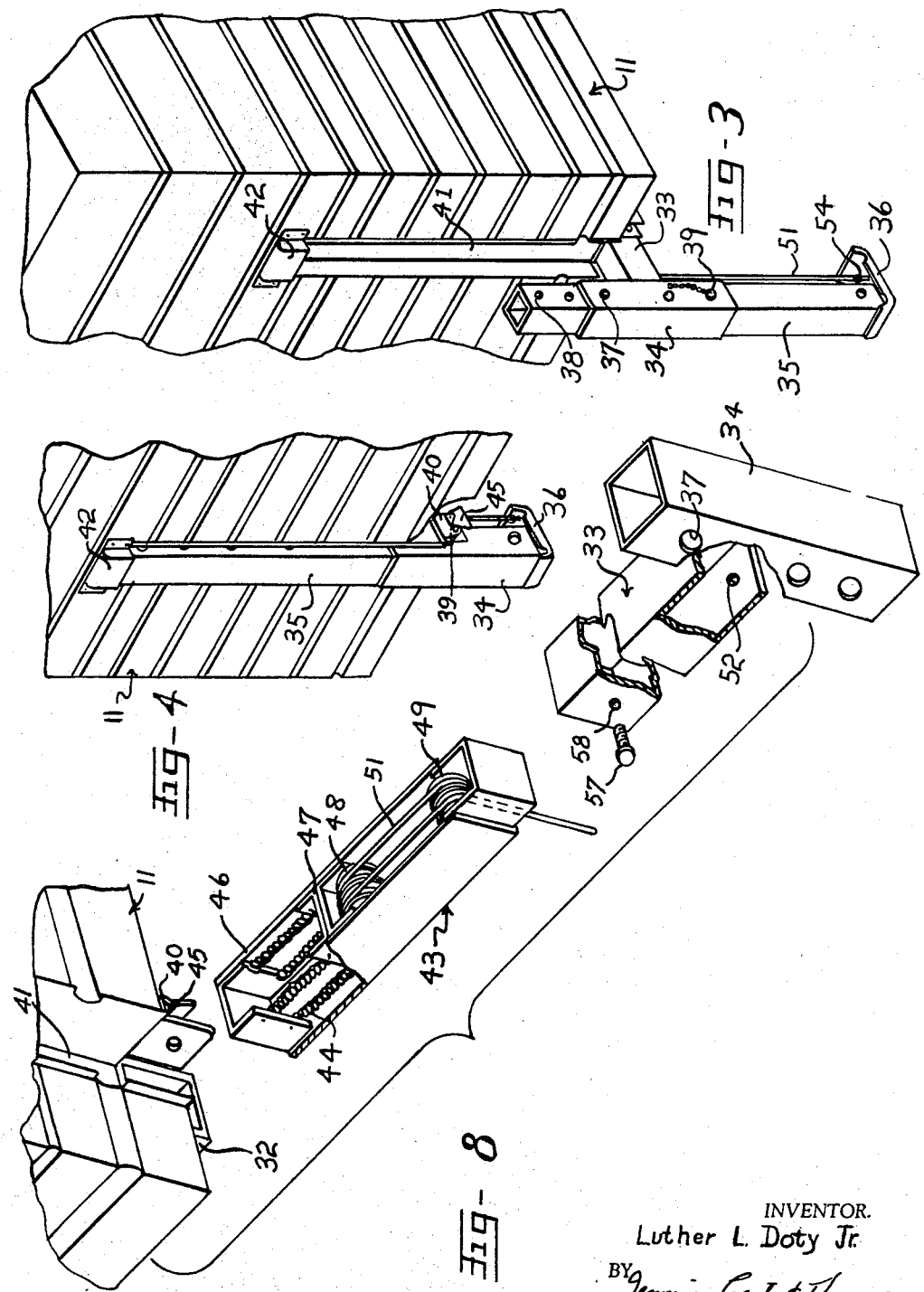

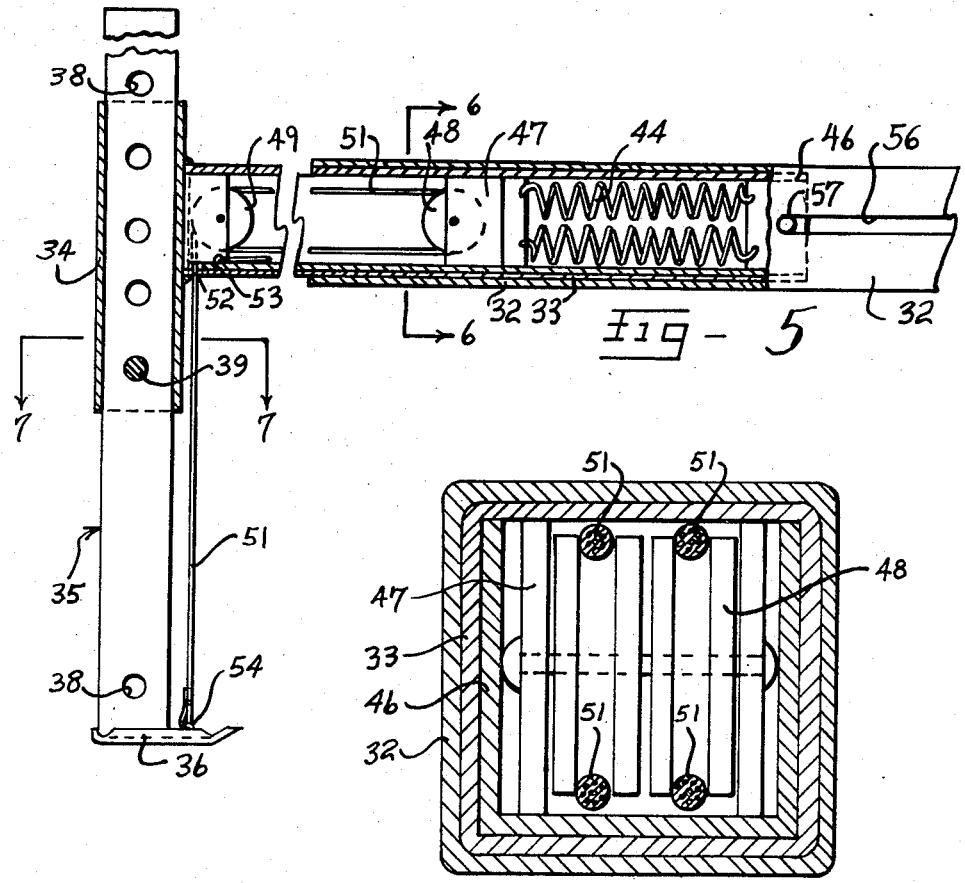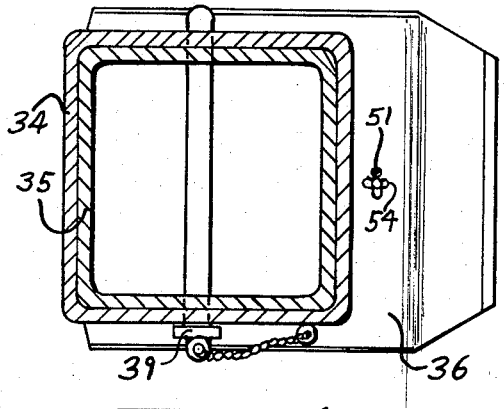

United States Patent Office 2,934,373
Patented Apr. 26, 1960

2,934,373

RETRACTABLE SUPPORTS FOR A REMOVABLE VEHICLE BODY

Luther L. Doty, Jr., Birmingham, Ala., assignor to Moore-Handley Hardware Company, Inc., a corporation of Alabama Application January 6, 1958, Serial No. 707,213

8 Claims. (Cl. 296—28)

This invention relates to retractable supports for a removable vehicle body and more particularly to the retracting means for the supporting legs of such a vehicle body.

The present invention is of the general class of removable vehicle bodies described in the present assignee's prior Patent No. 2,811,386, dated October 29, 1957 and comprises retracting means to assist in raising the supporting legs of a vehicle body which means are housed entirely within a transverse tubular member secured beneath the removable vehicle body.

The arrangement of the retracting means in such a location provides convenient accessibility, protects the retracting means and allows a small, compact unit. Further, the retracting means are arranged closely adjacent the supporting legs which are to be retracted, thereby necessitating only a relatively short connection to the legs. Thus, the time and labor required to raise the supporting legs is minimized over prior apparatus.

It is an object of the present invention to provide retracting means for the supporting legs of a removable vehicle body which means are housed entirely within a transverse tubular member adapted to be secured beneath the vehicle body.

It is a further object of the present invention to provide a second tubular member telescoping within the first mentioned tubular member and extending outwardly from the vehicle body with a supporting leg slidably mounted for vertical movement adjacent the outer end of the second tubular member, the supporting leg having a flexible member secured to its lower portion for assisting in the upward retracting movement of the leg.

It is an additional object of the present invention to provide force exerting means such, for instance, as one or more heavy duty coil springs operatively connected to the flexible member for continuously urging the supporting leg upwardly toward retracted position. Such connection to the force exerting means preferably comprises two spaced pairs of sheaves over which the flexible member passes, one pair being moved by the force exerting means relative to the other pair. Thus, a mechanical advantage of four to one is obtained and the resilient means moves only one-fourth the distance that the supporting legs move.

Apparatus illustrating features of my invention is shown in the accompanying drawings, forming a part of this application, in which:

Fig. 3 is a fragmentary perspective view of the present invention showing a supporting leg for a side of the removable vehicle body in extended position;

Fig. 4 is a fragmental perspective view of a supporting leg for the removable vehicle body shown in retracted position and nested in a recess of the removable vehicle body;

Fig. 5 is a fragmental side elevational view, partly broken away and in section, showing the retracting means for the supporting leg being housed within the tubular member;

Fig. 6 is an enlarged sectional view taken generally along line 6—6 of Fig. 5;

Fig. 7 is an enlarged sectional view taken generally along the line 7—7 of Fig. 5; and, Fig. 8 is a perspective view of the retracting means for a supporting leg shown removed from the transverse tubular member beneath the removable vehicle body, the view having its vertically extending dimensions drawn slightly off vertical.

Figures 1, 2:
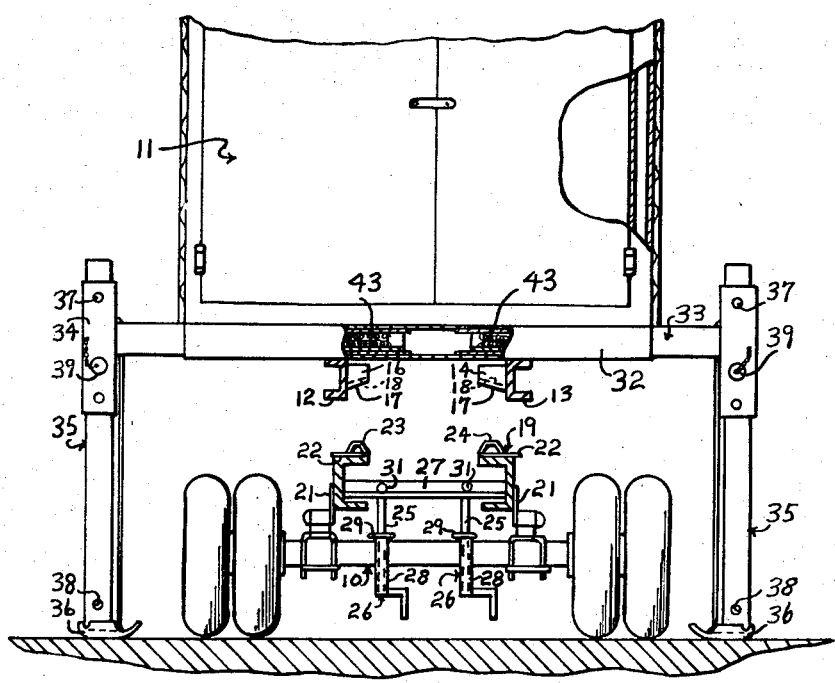
Fig. 1 is a rear elevational view of the present invention, partly broken away and in section, showing the rear end of the removable vehicle body with the supporting members attached thereto and means for attaching the vehicle body to a supporting chassis.
Fig. 2 is a fragmental plan view, partly broken away and in section, of the removable vehicle body shown in Fig. 1 and the supporting means therefor, showing a transverse tubular member on the underside of the removable vehicle body.

Referring now to the drawings for a better understanding of my invention, I show in Fig. 1 a vehicle chassis 10 which preferably may be in the form of a trailer adapted to support a removable vehicle body indicated generally by the numeral 11. The removable body 11 is provided with channel members 12 and 13 extending longitudinally therebeneath. Hold-down brackets 14 and 16 having sloping bottom walls 17 are secured to the inner side of channels 12 and 13. A slot 18 is arranged in each of the sloping sides 17 for a purpose to be explained later.

Frame members 22 of chassis 10 support a cradle 19 which may be raised and lowered by suitable hydraulic means (not shown) about pivot arms (not shown). Guide members 23 and 24 on cradle 19 position the removable vehicle body 11 on chassis 10.

To secure the removable vehicle body 11 on chassis 10, hold-down members indicated generally by the numeral 26 are slidably arranged in apertures extending through angle 27 secured to the frame members 22. Hold-down members 26 comprise rods 25 having threaded lower end portions on which are screwed internally threaded nut members 28. An abutment 29 is carried on the upper end of each of the nuts 28 and is adapted to engage the underside of angle 27 when chassis 10 is secured to the removable vehicle body 11. The upper ends of the rods 25 are provided with lateral extensions 31 which engage the brackets 14 and 16 when the shanks of the rods 25 are placed in the slots 18, thus to secure the removable body 11 to the chassis 10 when the nuts 28 are drawn up.

Starting with the body resting on its legs as in Fig. 1, to secure the body to the vehicle chassis 10, cradle 19 is moved upwardly by hydraulic means (not shown). Channels 12 and 13 are thus positioned adjacent guide members 23 and 24 respectively, and the legs are raised from the ground. In this position, the extensions 31 are placed in position in brackets 14 and 16 and nuts 28 are actuated until their abutments 29 are tight against angle 27. In this position, the retractable supports or legs presently to be described may be retracted. For further details of the lifting and body hold-down means, reference may be had to the previously mentioned prior Patent 2,811,386, dated October 29, 1957.

A transverse tubular member 32 is secured to the underside of the vehicle body 11 and extends transversely of the body for the entire width thereof. While the tubular member may be of several shapes, I preferably use a rectangular form. Arranged within the tubular member 32 on each end thereof is a second tubular member 33 which slidably telescopes within tubular member 32. Tubular member 33 is preferably formed of a rectangular shape so as to fit slidably and non-rotatably within tubular member 32. Thus, tubular members 33 can be extended from the end of tubular member 32 and thereby extend laterally from the sides of the removable body 11. A vertical sleeve 34, preferably rectangular in transverse section, is secured on the outer end of each of the tubular members 33 and is adapted for slidably receiving a supporting leg 35. The lower ends of the supporting legs 35 are provided with shoes 36 that rest on the ground.

In order to adjust the height of supporting legs 35 and thereby vary the height of the vehicle body 11 from the ground, I provide holes 37 in sleeve 34. Holes 38 on supporting legs 35 are adapted for alignment with the holes 37 so that a pin 39 can be inserted through the aligned holes and thereby position supporting legs 35 at predetermined selected heights above the supporting surface.

In Fig. 3, the supporting leg 35 is shown in extended position with the vehicle body 11 resting thereon. The vehicle body 11 (see Fig. 1) has a hollow wall and a recess 41 is provided therein for housing the supporting leg 35. Recess 41 may be arranged on the corner of the removable vehicle body 11 if preferred. As shown in Fig. 4, the supporting leg 35 is retracted and housed within recess 41 after tubular member 33 has been retracted within transverse member 32. A cover 42 is arranged at the top of recess 41 so as to protect the upper end of supporting leg 35. To secure leg 35 and tubular member 33 within transverse member 32 in retracted position, a bracket 40 having a hole therein is secured to the body 11 adjacent recess 41 as shown in Figs. 4 and 8. A cover 45 is pivoted on bracket 40 so that pin 39 may be held in place. Pin 39 is inserted through the hole in bracket 40 and the aligned holes 37 and 38 in tubular member 33 and leg 35, respectively, and cover 45 is then pivoted downwardly over the head of pin 39 thereby holding pin 39 in place.

Supporting legs 35 are of considerable weight and are somewhat burdensome to retract unless some counteracting or retracting means is provided to assist in the raising of the legs. I have provided a self-contained, force exerting leg retracting unit which can be inserted within tubular member 33 in which position it is protected, in effect occupies no additional space, and forms a part of the body support assembly. As shown in Fig. 8, the retracting unit, indicated generally by the numeral 43, is removed from the tubular member 33 which is in turn removed from the transverse tubular member 32 secured to the underside of the removable vehicle body 11.

The retracting unit 43 as shown in Figs. 5 and 8 comprises force exerting means 44 which are illustrated as four coil springs secured at one end to the housing 46 of the retracting unit 43. The other ends of the springs 44 are secured to a floating bracket 47. The bracket 47 is slidably mounted within the housing 46 and has on the end thereof opposite from springs 44 a pair of axially aligned sheaves 48. A second pair of axially aligned sheaves 49 is spaced from sheaves 48 and is secured to the frame 46 at an end thereof. A flexible cable 51 is attached at its lower end to the shoe 36 and extends through a hole 52 in the bottom of tubular member 33 upwardly around one of the pair of sheaves 49, next around one of the pair of sheaves 48, then around the second of the pair of sheaves 49 and thence around the second of the pair of sheaves 48. Cable 51 is then secured at its upper end to the frame 46 at 53 (see Fig. 5). An eye 54 is provided on shoe 36 for securing the end of the cable therearound. From what has been said, it is apparent that the floating bracket 47 and sheaves 48 are urged by springs 44 away from sheaves 49. This action exerts an upward pull on the lower end of cable 51, counter-balancing the weight of leg 35. Further, as a result of having four sheaves, a mechanical advantage of four to one is obtained. A relatively large movement of supporting legs 35 thus results only in a small movement of sheaves 48 and bracket 47 carrying the same. I have thus provided a small, compact leg retracting unit which may be housed within the slidable tubular member 33, which in turn carries the leg on its outer end.

While I have illustrated the retracting unit as comprising coil springs and sheaves housed within tubular member 33, my invention lends itself to the incorporation of other types of retracting units within tubular member 33 to retract leg 35.

To secure tubular member 33 within tubular member 32 and to limit the outward movement thereof, longitudinal slot 56 is provided on a side of tubular member 32 (see Fig. 5). A bolt 57 is screwed into a threaded hole 58 and projects slidably within slot 56, thereby limiting outward movement of tubular member 33. The inner end of bolt 57 engages against housing 46 of retracting unit 43 thus to hold the unit 43 in member 33. Retracting unit 43 thus moves with tubular member 33 when the latter moves inwardly and outwardly relative to the body.

From the foregoing, it will be seen that I have devised a force exerting unit for pivotally counterweighting the supporting legs of a removable vehicle body. My improved unit is housed within a tubular member which in turn telescopes within a second tubular member secured to the underside of the removable body. Thus, the retracting unit is protected from injury, is easily accessible, and can be replaced simply by removing the unit and inserting a new unit. Further, I provide resilient means in the retracting unit for urging a flexible cable that is secured at one end to the supporting legs 35. Two separate pairs of sheaves are operatively connected to the resilient means and the flexible cable passes around the sheaves with one pair of the sheaves arranged slidably in the housing for my removable unit. Thus, the supporting leg is continuously urged upwardly by this arrangement and a considerable pull is exerted through the resilient means.

A safety feature of the invention is provided as a result of the legs being urged upwardly, as the tendency of the legs to drop on the feet of workmen when the retractable legs are released is minimized by the counterbalancing effect of the retracting unit.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A retractable support for a removable vehicle body comprising a first tubular member extending transversely beneath and secured to the vehicle body, a second tubular member slidably arranged within said first tubular member and extending outwardly from said vehicle body, a supporting leg mounted for vertical movement adjacent the outer end of said second tubular member, means detachably connecting said leg to said second tubular member, a flexible member secured at one end to the lower portion of said leg, and force exerting means housed within said first tubular member and operatively connected to the other end of said flexible member to move the supporting leg upwardly.

2. A retractable support for a removable vehicle body comprising a first tubular member extending transversely beneath and secured to the vehicle body, a second tubular member telescoping slidably within said first tubular member and extending outwardly from said vehicle body, means limiting outward movement of said second tubular member, a supporting leg mounted for vertical movement adjacent the outer end of said second tubular member, means detachably connecting said leg to said second tubular member, a flexible member secured at one end to the lower portion of said leg, force exerting means anchored and housed within said first tubular member, and a sheave within said first tubular member over which the flexible member passes, said flexible member being operatively connected to said force exerting means to move said supporting leg upwardly.

3. A retractable support for a removable vehicle body comprising a first tubular member extending transversely beneath and secured to the vehicle body, a second tubular member telescoping slidably within said first tubular member and extending outwardly from said vehicle body, means limiting outward movement of said second tubular member, a supporting leg mounted for vertical movement adjacent the outer end of said second tubular member, means detachably connecting said leg to said second tubular member, a flexible member secured at one end to the lower portion of said leg beneath said second tubular member, resilient means anchored at one end within said first tubular member and housed therein, and at least one sheave slidable within said second tubular member and operatively connected to the other end of said resilient means, said flexible member passing over the sheave and being fixed at its other end whereby said resilient means continuously urges said supporting leg upwardly.

4. A retractable support for a removable vehicle body comprising a first tubular member extending transversely beneath and secured to the vehicle body, a second tubular member telescoping slidably within siad first tubular member and extending outwardly from said vehicle body, means limiting outward movement of said second tubular member, a supporting leg mounted for vertical movement adjacent the outer end of said second tubular member, means detachably connecting said leg to said second tubular member, a flexible member secured at one end to the lower portion of said leg beneath said second tubular member, resilient means anchored at one end within said first tubular member, a first pair of axially aligned sheaves slidable within said second tubular member over which the flexible member passes and being operatively connected to the other end of said resilient means, and a second pair of axially aligned sheaves fixed within said second tubular member over which the flexible member passes and being spaced from said first pair of sheaves, the other end of said flexible member being fixed whereby said resilient means continuously urge said supporting leg upwardly.

5. A retractable support for a removable vehicle body as defined in claim 4 further characterized in that the resilient means and the first and second pairs of sheaves are mounted in a common housing and slidably removable from said second tubular member.

6. In a support unit for a removable vehicle body, the combination of a tubular member having a vertically directed sleeve on an end thereof, a leg slidably received in said sleeve, a retracting unit having a housing arranged within the tubular member, said retracting unit comprising spring means anchored at one end to the housing, a first pair of axially aligned sheaves slidable within the housing and operatively connected to the other end of the spring means, a second pair of axially aligned sheaves fixed within the housing and spaced from the first pair of sheaves, and flexible means extending around said pairs of sheaves and operatively connecting the spring means in force transmitting relation to the leg whereby at least a part of the weight of said leg is counterbalanced in substantially all vertical positions of the leg.

7. A support unit as defined in claim 6 and further characterized in that the spring means comprises four heavy duty coil springs tensioned between the first pair of sheaves and the housing of said retracting unit.

8. The combination with a tubular member having a vertically directed sleeve at an end thereof adapted for receiving slidably a leg for supporting a vehicle body, of a retracting unit housed within the tubular member, said retracting unit comprising a pair of spaced sheaves with one of said sheaves being slidable relative to the other sheave, a flexible member secured at one end to the lower portion of said leg and passing over said sheaves and fixed at its other end, and resilient means anchored at one end and operatively connected at its other end to the slidable sheave, whereby at least a part of the weight of said leg is counterbalanced by said resilient means continuously urging said slidable sheave in such a direction that an upward pull is exerted on said leg by said flexible member.

References Cited in the file of this patent

UNITED STATES PATENTS

| | | |
|---|---|---|
| 2,079,149 | Bridgens | May 4, 1937 |
| 2,084,941 | Capello | June 22, 1937 |
| 2,555,336 | Hagely | June 5, 1951 |
| 2,703,659 | Hutchins | Mar. 8, 1955 |
| 2,811,386 | Shaw | Oct. 29, 1957 |